C. A. JOHNSON.

SHEET METAL FRAME.

APPLICATION FILED FEB. 18, 1915.

Reissued Sept. 21, 1915.

13,987.

2 SHEETS—SHEET 1.

WITNESSES:

H. Hirsch

E. A. Thompson

C. A. Johnson INVENTOR.

BY Howard P. Denison

ATTORNEY.

C. A. JOHNSON.
SHEET METAL FRAME.
APPLICATION FILED FEB. 18, 1915.
Reissued Sept. 21, 1915.
13,987.
2 SHEETS—SHEET 2.
Fig. 8.
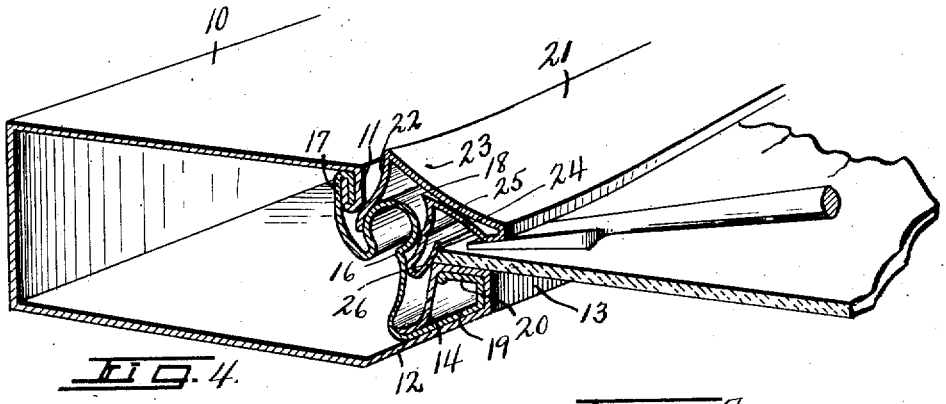
Fig. 4.
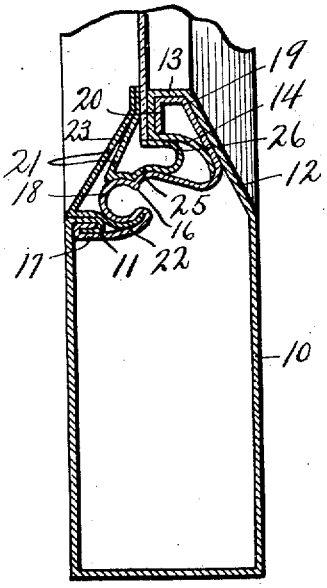
Fig. 7.
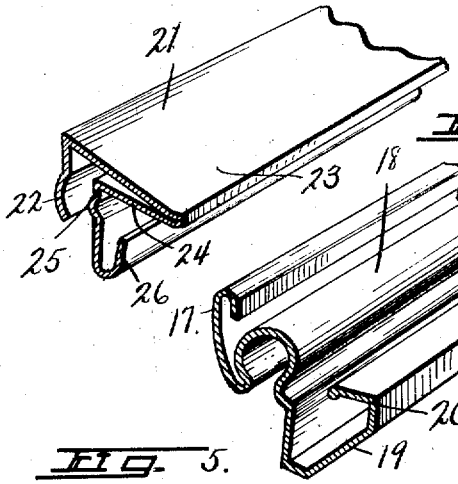
Fig. 6.
Fig. 5.
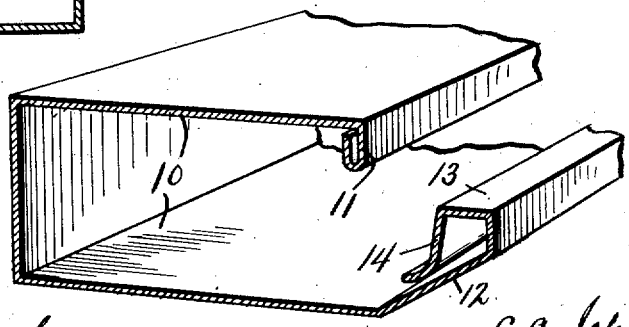
WITNESSES:
H. Hurst.
E. M. Thompson
INVENTOR.
C. A. Johnson
BY Edward P. Arrison
ATTORNEY.

UNITED STATES PATENT OFFICE.

CONRAD A. JOHNSON, OF JAMESTOWN, NEW YORK.

SHEET-METAL FRAME.

13,987. Specification of Reissued Letters Patent. Reissued Sept. 21, 1915.

Original No. 1,076,767, dated October 28, 1913, Serial No. 737,115. Application for reissue filed February 18, 1915. Serial No. 9,186.

*To all whom it may concern:*

Be it known that I, CONRAD A. JOHNSON, a citizen of the United States, and resident of Jamestown, in the county of Chautauqua, in the State of New York, have invented new and useful Improvements in Sheet-Metal Frames, of which the following, taken in connection with the accompanying drawings, is a full, clear, and exact description.

This invention relates to windows and has for an object to provide a sheet metal window sash having novel means for securing a screen or a window pane without the use of screws, nails, putty or similar devices.

A further object of the invention is to provide a sash having a spring locking strip which when applied will secure the screen or window pane tightly in place, and which may be easily manually removed to permit withdrawal of the screen or pane.

With the above objects in view the invention consists of certain novel details of construction and combination of parts hereinafter fully described and claimed, it being understood that various modifications may be made in the minor details of construction within the scope of the appended claims.

Figure 1:
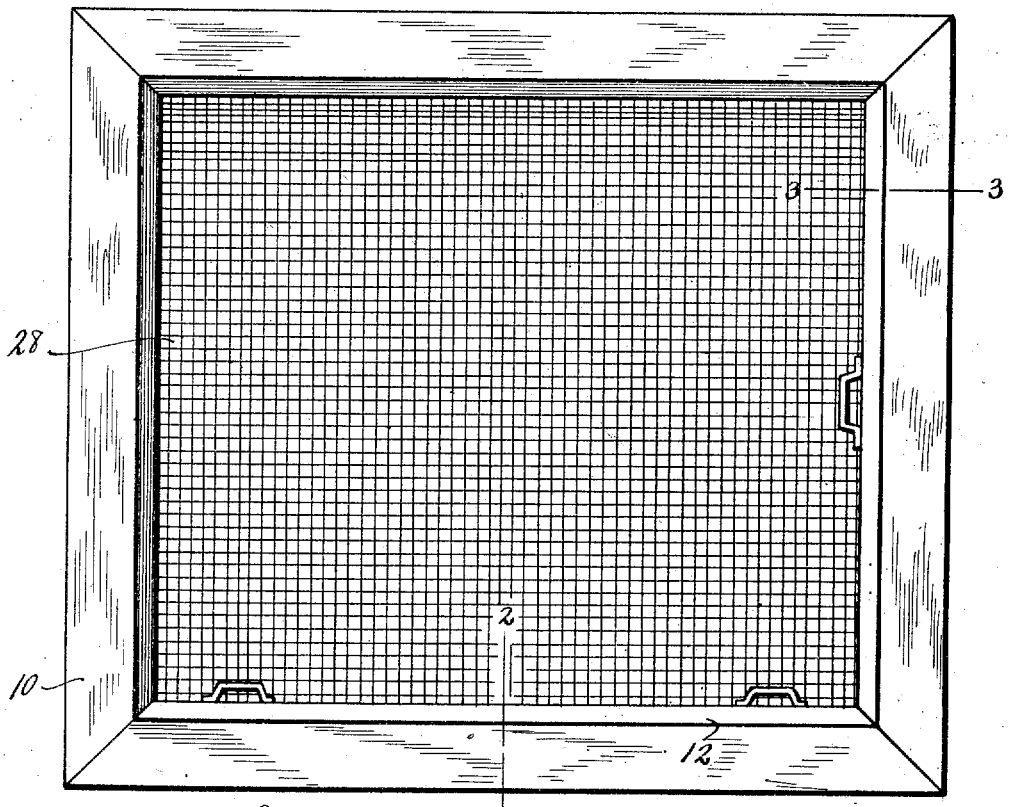
Figure 2:
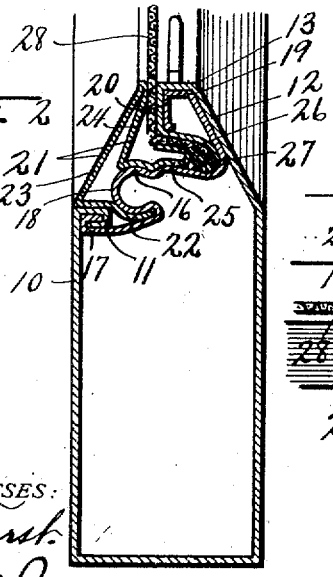
Figure 3:
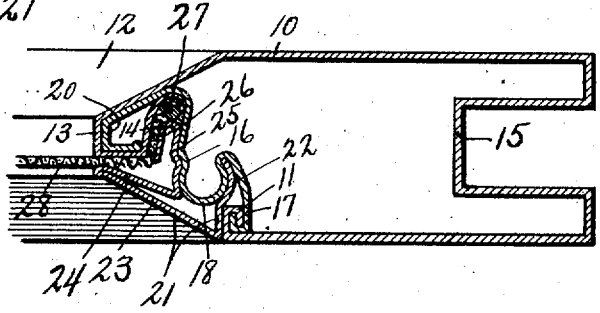

In the accompanying drawings forming part of this specification:—Figure 1 is a front elevation of a screen embodying my improvements. Fig. 2 is a cross sectional view taken on the line 2—2, Fig. 1. Fig. 3 is a cross sectional view taken on the line 3—3, Fig. 1. Fig. 4 is a view similar to Fig. 3 showing a pane of glass substituted for the screen. Fig. 5 is a fragmentary perspective view of one rail of the sash. Fig. 6 is a fragmentary perspective view of the abutment rib. Fig. 7 is a fragmentary perspective view of the locking rib. Fig. 8 is a fragmentary perspective view showing the manner of releasing the locking rib.

Referring now to the drawings in which like characters of reference designate similar parts, —10— designates the sash which is preferably formed of sheet metal. In constructing each rail of the sash, the sheet metal is bent in the form of a U as shown, one leg being terminally formed with an inwardly directed hook flange —11—, and the other leg being terminally bent obliquely inwardly beyond the flange —11— as shown at —12—, thence bent inwardly and backwardly upon itself in the form of a rightangle as shown at —13—, the extreme end being bent back toward the inclined portion —12— to form a spring leaf —14—. Both side rails of the sash are formed with guide strip receiving depressions —15—.

The abutment rib —16— is formed from a single length of sheet metal, one edge of which is bent to form a hook flange —17— adapted to interlock with the hook flange —11— of the rail, the material thence being bent to form a longitudinal rib —18— of substantially circular cross section, and the other edge of the material being bent obliquely toward the rib as shown at —19—, thence being terminally bent inwardly and backwardly in the form of a rightangle as shown at —20— which is adapted to fit within and snugly conform to the contour of the rightangular extremity —13— of the rail. The abutment rib thus bridges and secures together the legs of the rail.

The retaining strip or locking rib —21— is bent longitudinally at one edge to form a jaw —22— adapted to conform to the contour of one side of the rib —18— and to lie under the rib formed by the hook flanges —11— and —17—, and is extended from this jaw in a straight portion —23— adapted to extend toward and contact with the rightangular portion —13— of the rail, and is thence bent back upon itself as shown at —24— to stiffen the portion —23—, the stiffening portion being terminally bent to form a curved spring jaw —25— which is adapted to conform to the contour of the opposite side of the rib —18— from the jaw —22—, the jaw —25— being thence bent terminally to form a hook-like flange —26— adapted to enter the space between the spring leaf —14— of the rail and adjacent portion of the abutment rib and to bear against and clamp into this space a rod —27—.

When it is desired to secure a panel or screen —28— in the sash, the marginal edges of the panel or screen are inserted in the space between the spring leaf —14— of each rail and adjacent portion of the abutment rib —16— and the rod —27— then placed upon the screen as clearly shown in Fig. 2. The retaining strip or locking rib —21— is then applied by pressing the spring jaws —22— and —25— over the rib —18— whereupon the straight portion —23— of the locking rib bears upon and binds the screen against the rightangular portion —13— of the rail and the hook flange —26— of the locking rib bears against the rod —27— and prevents withdrawal of the panel or screen.

When it is desired to apply a window pane —29— to the sash the rods —27— are dispensed with, and the marginal edges of the pane are placed upon the rightangular portions —13— of each rail. The retaining strip or locking rib —21— is then applied by pressing the spring jaws over the rib —18—, whereupon the straight portion —23— of the locking rib bears upon and binds the marginal edges of the pane against the rightangular portion —13— of the rail.

To detach the locking rib in order to substitute the screen for the window pane or vice versa, it is simply necessary to insert the point of a screw-driver or other tool between the straight portion —13— of the rib and window pane or screen as the case may be, then pry the straight portion outwardly, whereby the spring jaws expand and facilitate the locking rib being withdrawn bodily outwardly.

Although I have shown and described one particular construction and arrangement of parts, I do not desire to limit myself to the same, as many changes may be made in the details of construction and arrangement without departing from the spirit of the invention as set forth in the appended claims, the essence of which resides in a metallic frame formed of side rails united, and preferably mitered, at their ends to form corners and having a plurality of channels, preferably two as shown, adjacent each other, in combination with a locking strip having flanges adapted to be positioned respectively in said channels and a portion connecting said flanges, said combined parts all formed and arranged so that a transverse or partially transverse pull on the inner of said flanges and tending to draw the same from position in its respective channel, causes the other flange to interlock more securely with the wall of its respective channel to prevent removal of the panel or screen.

What I claim is:—

1. In a sheet metal frame, a rail having a portion of one side thereof substantially W-shape in cross section forming separate lengthwise channels and an intermediate rib, and a clamping bar having spaced lengthwise flanges insertible in said channels, one of said flanges frictionally engaging with one side of said rib.

2. In a sheet metal frame, a rail having a portion of one side thereof substantially W-shape in cross section forming inner and outer lengthwise channels and an interposed lengthwise rib, the side of the rib adjacent the outer channel being undercut, and a clamping bar having spaced lengthwise flanges seated in said channels, one of the flanges frictionally engaging the undercut side of the rib.

3. A sheet metal frame formed of side rails, each rail provided with a plurality of longitudinally extending channels comprising an intermediate wall, the outer of said channels converging inwardly toward the inner channel, whereby the intermediate wall overlies a portion of the outer channel, the inner of said channels adapted to receive the marginal portion of a panel, and a retaining strip having an arm in each channel, the arm in the outer channel extending beneath the overlying portion of said intermediate wall to frictionally engage therewith to prevent removal of the panel.

4. A sheet metal frame formed of side rails, each rail provided with a pair of longitudinally extending channels embodying an intermediate wall, a panel having a marginal portion in the inner of said channels, and a retaining strip having an arm in each channel, the parts so formed and arranged that tension upon the panel tending to draw the arm in contact therewith from its position in the inner channel interlocks the other arm more positively with said intermediate wall to prevent removal of the panel.

5. A sheet metal frame comprising closed tubular rails having a pair of substantially parallel channels embodying an interposed rib, said channels formed by depressing adjacent portions of one side of the rails toward the opposite side, the inner of said channels adapted to receive the marginal portion of a panel, and a retaining strip having an arm in each channel, the arm in the outer channel adapted to frictionally engage said intermediate rib to prevent removal of the panel.

6. A sash comprising channel metal rails connected together, a bridge member connecting the legs of each channel metal rail and having a longitudinal bead of substantially circular cross section, and a locking member having a straight portion adapted to clamp the marginal edge of a screen against one of said legs and terminating in spring jaws adapted to engage with said bead.

7. A sash comprising channel metal rails connected together, each rail having one leg terminating in a substantially rightangular abutment portion, a bridge member connecting said legs and having a longitudinal bead, and a locking member having curved spring jaws adapted to engage with said bead, and having a straight portion connecting said jaws and extending obliquely along said jaws, said straight portion adapted to clamp the marginal edge of a screen against said abutment portion.

8. A sash comprising channel metal rails connected together, each rail having one leg terminating in a substantially rightangular abutment portion, a bridge member connecting said legs and having a longitudinal bead, a screen member having a marginal edge bearing against said abutment portion, a rod carried by said marginal edge and bearing against said bridge member, and a locking member having spring jaws engaging said longitudinal rib and having a portion bearing against said rod and clamping the same against said bridge member, and having a portion between said clamping portion and said jaws bearing against said screen and clamping the same to said abutment portion.

In witness whereof, I have hereunto set my hand this 9th day of February, 1915.

CONRAD A. JOHNSON.

Witnesses:

CLARENCE JOHNSON,
BERNARD M. JOHNSON.